US009905036B2

(12) United States Patent
Kim et al.

(10) Patent No.: US 9,905,036 B2
(45) Date of Patent: Feb. 27, 2018

(54) GRAPHICS PROCESSING UNIT FOR ADJUSTING LEVEL-OF-DETAIL, METHOD OF OPERATING THE SAME, AND DEVICES INCLUDING THE SAME

(71) Applicant: Samsung Electronics Co., Ltd., Suwon-si (KR)

(72) Inventors: Seok Hoon Kim, Yongin-si (KR); Chang Hyu Yu, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 89 days.

(21) Appl. No.: 14/812,099

(22) Filed: Jul. 29, 2015

(65) Prior Publication Data

US 2016/0104458 A1    Apr. 14, 2016

(30) Foreign Application Priority Data

Oct. 10, 2014    (KR) .................. 10-2014-0136583

(51) Int. Cl.
  *G06T 15/00*     (2011.01)
  *G06T 17/20*     (2006.01)
  *G09G 5/36*      (2006.01)

(52) U.S. Cl.
  CPC ........ *G06T 15/005* (2013.01); *G06T 2210/36* (2013.01); *G09G 5/363* (2013.01)

(58) Field of Classification Search
  CPC ......... G06T 11/00; G06T 15/00; G06T 15/04; G06T 15/08; G06T 17/205; G06T 2210/36
  USPC ....................................................... 345/423
  See application file for complete search history.

(56) References Cited

U.S. PATENT DOCUMENTS

| | | | |
|---|---|---|---|
| 5,953,015 A | 9/1999 | Choi | |
| 6,100,898 A | 8/2000 | Malamy et al. | |
| 6,441,817 B1* | 8/2002 | Gossweiler, III | G06T 15/405 345/422 |
| 6,600,485 B1* | 7/2003 | Yoshida | G06T 17/30 345/419 |
| 7,262,777 B2 | 8/2007 | Liao et al. | |
| 8,281,281 B1* | 10/2012 | Smyrl | G06T 13/00 345/428 |
| 8,284,197 B2 | 10/2012 | Barczak | |
| 8,487,948 B2 | 7/2013 | Kai et al. | |
| 9,405,442 B1* | 8/2016 | Zhang | G06F 3/0484 |
| 2003/0210271 A1* | 11/2003 | King | G09G 5/363 715/771 |
| 2005/0024375 A1* | 2/2005 | Horton | G06T 15/04 345/582 |
| 2007/0211054 A1* | 9/2007 | Lee | G06T 15/205 345/427 |
| 2007/0216676 A1* | 9/2007 | Lee | G06T 15/205 345/419 |
| 2008/0055335 A1 | 3/2008 | Jung et al. | |

(Continued)

FOREIGN PATENT DOCUMENTS

| | | |
|---|---|---|
| JP | 2005228223 | 8/2005 |
| KR | 100809522 | 3/2008 |

*Primary Examiner* — Ulka Chauhan
*Assistant Examiner* — Sae Won Yoon
(74) *Attorney, Agent, or Firm* — Onello & Mello, LLP

(57) ABSTRACT

A graphics processing unit includes a shader configured to perform one operation among tessellation and texturing. The shader generates level-of-detail (LOD) using geometry information for the tessellation or texturing and adjusts the LOD using non-geometry information for the tessellation or texturing.

14 Claims, 13 Drawing Sheets

(56) References Cited

U.S. PATENT DOCUMENTS

| | | | |
|---|---|---|---|
| 2008/0094409 A1* | 4/2008 | Koguchi | G06T 15/04 345/582 |
| 2009/0033659 A1 | 2/2009 | Lake et al. | |
| 2010/0164954 A1 | 7/2010 | Sathe et al. | |
| 2010/0231588 A1* | 9/2010 | Barczak | G06T 15/405 345/422 |
| 2012/0038657 A1* | 2/2012 | Grossman | G06T 15/04 345/585 |
| 2013/0187939 A1* | 7/2013 | Rohlf | G06F 3/14 345/582 |
| 2013/0194260 A1* | 8/2013 | Kunath | G06T 17/05 345/420 |
| 2013/0321399 A1* | 12/2013 | Rohlf | G06T 17/05 345/419 |
| 2013/0342537 A1* | 12/2013 | Vorhies | G06T 5/00 345/428 |
| 2015/0084975 A1* | 3/2015 | Heinrich | G06T 1/60 345/552 |
| 2015/0279055 A1* | 10/2015 | Kaburlasos | G06T 5/002 345/587 |

* cited by examiner

FIG. 5

CASE1: ABS_B1

------------- REFB

CASE2: ABS_B2

------------- REFD

CASE3: ABS_B3

GRAPHICS PROCESSING UNIT FOR ADJUSTING LEVEL-OF-DETAIL, METHOD OF OPERATING THE SAME, AND DEVICES INCLUDING THE SAME

CROSS-REFERENCE TO RELATED APPLICATION

This application claims priority under 35 U.S.C. § 119(a) from Korean Patent Application No. 10-2014-0136583 filed on Oct. 10, 2014, the disclosure of which is hereby incorporated by reference in its entirety.

BACKGROUND

Exemplary embodiments of inventive concepts relate to a graphics processing technique, and more particularly, to a graphics processing unit (GPU) capable of calculating a level-of-detail (LOD) for tessellation or texturing using geometry information and adjusting the LOD using non-geometry information, a method of operating the same, and devices including the same.

In computer graphics, LOD involves adjusting image detail according to distance from a viewer. Such adjustments principally take the form of decreasing the complexity of a three-dimensional (3D) object representation as it moves away from a viewer.

LOD techniques increase the efficiency of rendering by decreasing the workload on graphics pipeline stages (for example, vertex transformations). LOD is usually generated using geometry information only. For example, LOD is generated based on depth values of control points or curvature in tessellation. LOD is generated based on distances between texels of adjacent pixels in texturing.

However, visual appearance is not defined based on geometry information and, as a result, if LOD is not appropriately adjusted, the efficiency of rendering and visual quality will not be satisfactory.

SUMMARY

In exemplary embodiments in accordance with principle of inventive concepts a method of adjusting level-of-detail (LOD) using a graphics processing unit including a shader configured to perform one operation from among either tessellation or texturing, the method including calculating LOD using geometry information for the one operation; and adjusting the LOD using non-geometry information for the one operation.

In exemplary embodiments in accordance with principle of inventive concepts a method includes the geometry information and the non-geometry information is output from one source.

In exemplary embodiments in accordance with principle of inventive concepts a method includes the one source is one of either a vertex shader or and a rasterizer.

In exemplary embodiments in accordance with principle of inventive concepts a method includes the geometry information is output from a first source and the non-geometry information is output from a second source.

In exemplary embodiments in accordance with principle of inventive concepts a method includes the first source is one of either a vertex shader or and a rasterizer and the second source is one of either a frame buffer object or a frame buffer storing a previous frame.

In exemplary embodiments in accordance with principle of inventive concepts a method includes the geometry information and the non-geometry information are related to one frame.

In exemplary embodiments in accordance with principle of inventive concepts a method includes the geometry information and the non-geometry information are related to different frames, respectively.

In exemplary embodiments in accordance with principle of inventive concepts a method includes the geometry information is related to a about a current frame and the non-geometry information is related to a previous frame.

In exemplary embodiments in accordance with principle of inventive concepts a method includes the non-geometry information is a brightness value of one from among a patch, a primitive, and a frame.

In exemplary embodiments in accordance with principle of inventive concepts a method includes when the non-geometry information is a brightness value of one from among a patch, a primitive, and a frame, and the adjusting of the LOD comprises: maintaining or decreasing the LOD when the brightness value is greater than a first brightness reference value; maintaining or decreasing the LOD when the brightness value is less than a second brightness reference value less than the first brightness reference value; and maintaining or increasing the LOD when the brightness value is between the first brightness reference value and the second brightness reference value.

In exemplary embodiments in accordance with principle of inventive concepts a method includes the non-geometry information is a moving speed of one from among a patch and a primitive moving between frames.

In exemplary embodiments in accordance with principle of inventive concepts a method includes the non-geometry information is a moving speed of one from among a patch and a primitive moving between frames, the adjusting the LOD comprises maintaining or increasing the LOD when the one from among the patch and the primitive moves slowly at a center of the frames.

In exemplary embodiments in accordance with principle of inventive concepts a method includes the LOD is assigned for each object, primitive, patch, edge, vertex or control point.

In exemplary embodiments in accordance with principle of inventive concepts a non-transitory computer-readable recording medium for recording a computer program for executing the method of adjusting level-of-detail (LOD) using a graphics processing unit including a shader configured to perform one operation from among either tessellation or and texturing, the method including calculating LOD using geometry information for the one operation; and adjusting the LOD using non-geometry information for the one operation.

In exemplary embodiments in accordance with principles of inventive concepts a graphics processing unit includes a shader configured to perform one operation from among tessellation and texturing, wherein the shader generates level-of-detail (LOD) using geometry information for the one operation and adjusts the LOD using non-geometry information for the one operation.

In exemplary embodiments in accordance with principles of inventive concepts a graphics processing unit includes a unified shader.

In exemplary embodiments in accordance with principles of inventive concepts a graphics processing unit includes a vertex shader and a rasterizer, wherein the geometry information and the non-geometry information is output from one of the vertex shader and the rasterizer.

In exemplary embodiments in accordance with principles of inventive concepts a graphics processing unit includes a vertex shader; a rasterizer; and a buffer configured to store one of a current frame and a previous frame, wherein the geometry information is output from one of the vertex shader and the rasterizer, the non-geometry information is output from the buffer, and the geometry information is related to the current frame.

In exemplary embodiments in accordance with principles of inventive concepts a graphics processing unit includes wherein the non-geometry information is one from among brightness, moving speed, and color gradient of one of a patch and a primitive for the one operation among the tessellation and the texturing.

In exemplary embodiments in accordance with principles of inventive concepts a system on a chip includes a central processing unit (CPU); and a graphics processing unit including a shader configured to perform one operation from among tessellation and texturing in response to a command output from the CPU, wherein the shader generates level-of-detail (LOD) using geometry information for the one operation and adjusts the LOD using non-geometry information for the one operation.

In exemplary embodiments in accordance with principles of inventive concepts a system on a chip includes wherein the non-geometry information is one from among brightness, moving speed, and color gradient of one of a patch and a primitive for the one operation among the tessellation and the texturing.

In exemplary embodiments in accordance with principles of inventive concepts a system on a chip includes, wherein the graphics processing unit further comprises a vertex shader and a rasterizer, wherein the geometry information and the non-geometry information are output from one of the vertex shader or the rasterizer.

In exemplary embodiments in accordance with principles of inventive concepts a system on a chip includes wherein the graphics processing unit further comprises a vertex shader; a rasterizer; and a buffer configured to store one of a current frame and a previous frame, wherein the geometry information is output from one of the vertex shader and the rasterizer, the non-geometry information is output from the buffer, and the geometry information is about the current frame.

In exemplary embodiments in accordance with principles of inventive concepts an electronic device includes a system on chip (SoC); and a memory connected to the SoC, wherein the SoC includes: a memory controller configured to control an operation of the memory; a central processing unit (CPU); and a graphics processing unit including a shader configured to perform one operation from among tessellation and texturing in response to a command output from the CPU, wherein the shader generates level-of-detail (LOD) using geometry information for the one operation and adjusts the LOD using non-geometry information for the one operation.

In exemplary embodiments in accordance with principles of inventive concepts an electronic device includes an electronic device wherein the non-geometry information is one from among brightness, moving speed, and color gradient of one of a patch and a primitive for the one operation among the tessellation and the texturing.

In exemplary embodiments in accordance with principles of inventive concepts an electronic device includes wherein the graphics processing unit further comprises a vertex shader and a rasterizer, wherein the geometry information and the non-geometry information is output from one of the vertex shader and the rasterizer.

In exemplary embodiments in accordance with principles of inventive concepts an electronic device includes wherein the graphics processing unit further comprises: a vertex shader; a rasterizer; and a buffer configured to store at least one of a current frame and a previous frame, wherein the geometry information is output from one of the vertex shader and the rasterizer, the non-geometry information is output from the buffer, and the geometry information is related to the current frame. In exemplary embodiments in accordance with principles of inventive concepts, a graphics processor may include a processor to generate a base level of detail using geometry information: and the processor using non-geometry information to determine definiteness an image primitive and to adjust the base level of detail depending upon the definiteness of the image primitive.

In exemplary embodiments in accordance with principles of inventive concepts, a graphics processor is configured to employ absolute brightness as non-geometry information.

In exemplary embodiments in accordance with principles of inventive concepts, a graphics processor is configured to employ relative brightness as non-geometry information.

In exemplary embodiments in accordance with principles of inventive concepts, a graphics processor is configured to employ color shading as non-geometry information.

In exemplary embodiments in accordance with principles of inventive concepts, a graphics processor is configured to employ speed as non-geometry information.

BRIEF DESCRIPTION OF THE DRAWINGS

The above and other features and advantages of the inventive concept will become more apparent by describing in detail exemplary embodiments thereof with reference to the attached drawings in which:

FIG. 5 is a conceptual diagram for explaining comparative operations with respect to a generated absolute brightness value and an absolute brightness reference value;

DESCRIPTION

Figure 1:
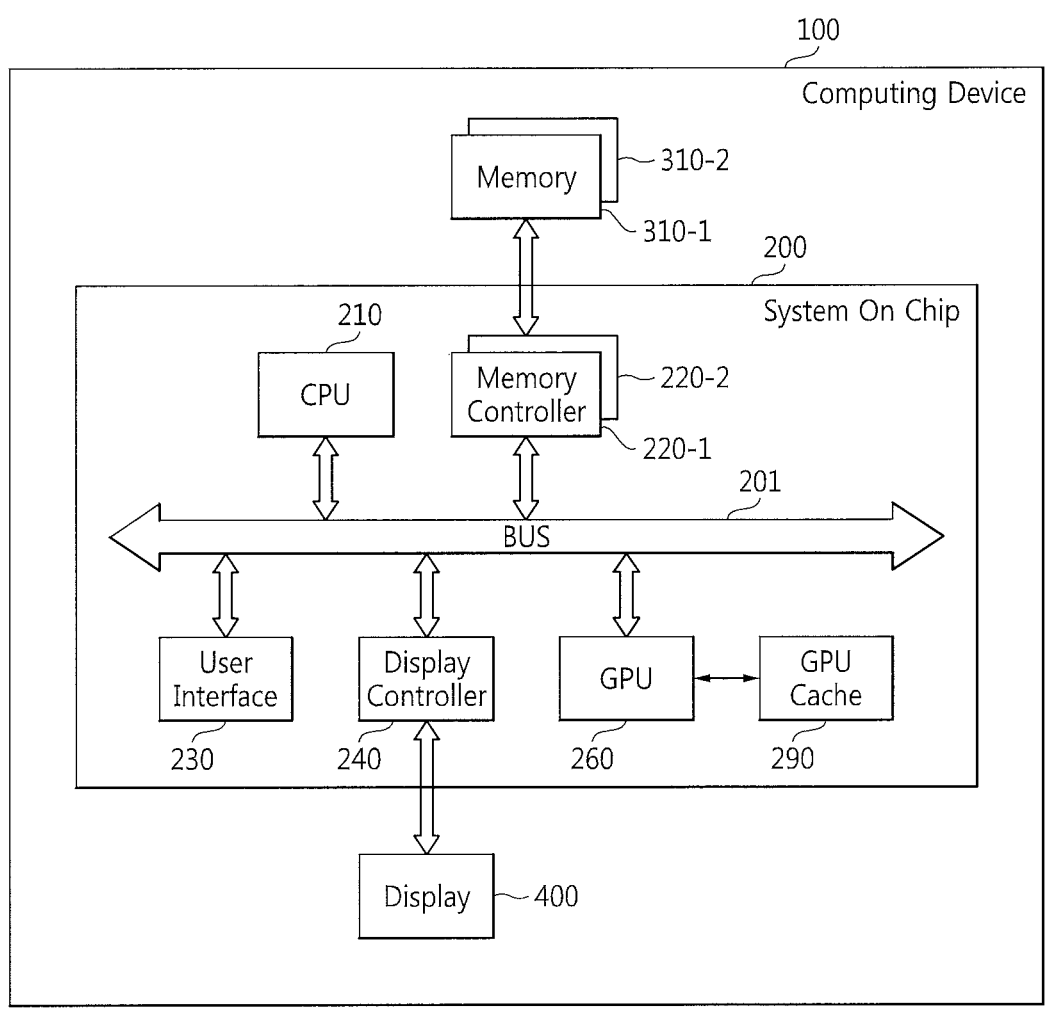
FIG. 1 is a block diagram of a computing device according to some embodiments of the inventive concept.

Inventive concepts now will be described more fully hereinafter with reference to the accompanying drawings, in which exemplary embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of inventive concepts. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concepts belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

A system and method in accordance with principles of inventive concepts employs non-geometry factors (which may also be referred to as non-geometric factors) to adjust level of detail in an image. Non-geometry factors include brightness, color-gradient, and velocity between frames of a primitive (for example, an arc, square, or cone, for example, from which more complicated images may be constructed).

In accordance with principles of inventive concepts, a base, or starting, level of detail may be generated based on geometry factors. In exemplary embodiments, geometry factors may include the curvature of control points or the distance of textels given by a shader, for example and the base level of detail may be produced by a Hull shader or Fragment shader, for example. A system and method in accordance with principles of inventive concepts then generates the absolute brightness (of a primitive or group of textels, for example), and compares the absolute brightness to upper (bright) and lower (dark) thresholds. If the absolute brightness falls outside the range of the upper and lower brightness thresholds, the base level of detail is adjusted to improve it and to, for example, bring it to within the range of the upper and lower absolute brightness thresholds. If the base absolute brightness level falls within the range of the upper and lower thresholds, no adjustment is made.

Relative brightness may also be employed to adjust level of detail in a system and method in accordance with principles of inventive concepts. If an image is substantially dark, with a region that is less dark, the level of detail of the less dark region should be higher than the surrounding, darker, region. Relative brightness may be employed, for example, only when absolute brightness (also referred to herein as computed absolute brightness or base absolute brightness) is outside the range of higher and lower absolute brightness thresholds. If absolute brightness is outside the range (too high or too low) "target" brightness values may be compared with nearby brightness values, using, for example, a Hall or Fragment shader. If relative the brightness is outside the range, a system and method in accordance with principles of inventive concepts may adjust LOD based on relative brightness.

Levels of detail may be assigned on objects, primitive, edge, vertex, or control point, for example. Graphic images are created in a graphics pipeline using level of detail adjustments to maintain image quality while reducing processing requirements. Geometry factors are typically employed in level of detail adjustments. Tessellation may provide level of detail adjustments based on the curvature or depth values of control points and texturing may employ texels' distances of neighboring pixels to produce level of detail adjustments.

However, because visual quality is not defined by geometry alone (lighting, movement and other factors, in addition to geometry factors, play a role in visual quality) a system and method in accordance with principles of inventive concepts refines a base, or starting, level of detail initially developed using geometry factors by employing extra-geometry factors such as just described. If a primitive's brightness level is too high (too bright) or too low (too dark) the primitive appears indefinite, unresolved, and, as a result, in accordance with principles of inventive concepts, it's level of detail may be reduced, in order to de-emphasize the primitive and thereby improve the appearance, the perceived clarity, of the overall image of which it is a part. On the other hand, if a primitive's brightness level is proper, in accordance with principles of inventive concepts, its level of detail may be increased in order to improve the appearance of the image.

For example, if a primitive is located in a dark region, it is relatively difficult to see and, in accordance with principles of inventive concepts, its level of detail may be reduced without affecting perceived image quality. Although the perceived image quality appears preserved, processing may be greatly reduced because the level of detail has been reduced. Similarly, if a primitive is in the center of an image and slowly moves between frames, a viewer will be acutely aware of it and, therefore, its importance to perceived image quality is great and, in accordance with principles of inventive concepts, its level of detail may be increased. Similarly, if the color gradient of a primitive is low, its level of detail may also be reduced in accordance with principles of inventive concepts to reduce processing requirements while maintaining perceived image quality.

Using non-geometry factors, also referred to herein as extra-geometry factors, such as brightness, color gradient, or velocity between frames to adjust level of detail, in accordance with principles of inventive concepts, provides an improved level of detail. With the improved level of detail, other operations, such as rendering, may be simplified, thereby maintaining image quality while reducing processing requirements.

FIG. 1 is a block diagram of a computing device 100 according to some exemplary embodiments of inventive concepts. The computing device 100 may be implemented as a television (TV), a personal computer (PC), a desktop computer, a laptop computer, a computer workstation, a tablet PC, a video game platform (or a video game console), a server, or a portable electronic device (or a mobile computing device), for example. The portable electronic device may be a cellular phone, a smart phone, a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an internet of things (IoT) device, an internet of everything (IoE) device, or an e-book, for example.

The computing device 100 may include various types of devices that can process and display two-dimensional (2D) or three-dimensional (3D) graphics data. The computing device 100 includes a system on chip (SoC) 200, one or more memories 310-1 and 310-2, and a display 400.

The SoC 200 may function as a host. In other words, the SoC 200 may control the overall operation of the computing device 100. For example, the SoC 200 implemented as an integrated circuit (IC), an application processor (AP), or a mobile AP, which can perform operations described hereinafter in exemplary embodiments of inventive concepts.

A central processing unit (CPU) 210, one or more memory controllers 220-1 and 220-2, a user interface 230, a display controller 240, and a graphics processing unit (GPU) 260 communicate with one another through a bus 201. For example, the bus 201 may be implemented as a peripheral component interconnect (PCI) bus, a PCI express bus, an advanced microcontroller bus architecture (AMBA), an advanced high-performance bus (AHB), an advanced peripheral bus (APB), an advanced extensible interface (AXI), or a combination thereof. The CPU 210 may control the operation of the SoC 200.

A user may enter an input into the SoC 200 through the user interface 230 so that the CPU 210 executes at least one application (for example, software application). The at least one application executed by the CPU 210 may include an operating system (OS), a word processor application, a media player application, a video game application, and/or a graphical user interface (GUI) application, for example.

A user may enter an input into the SoC 200 through an input device (not shown) connected to the user interface 230. For example, the input device may be implemented as a keyboard, a mouse, a microphone, or a touch pad. Applications executed by the CPU 210 may include graphics rendering instructions, which may be related with graphics application programming interface (API), for example.

Graphics API is open graphics library (OpenGL®) API, open graphics library for embedded systems (Open GL ES) API, DirectX API, Renderscript API, WebGL API, or Open VG (R) API. To process graphics rendering instructions, the CPU 210 may transmit a graphics rendering command to the GPU 260 through the bus 201. The GPU 260 may process (or render) graphics data in response to the graphics rendering command.

The graphics data may include points, lines, triangles, quadrilaterals, patches, and/or primitives. The graphics data may also include line segments, elliptical arcs, quadratic Bezier curves, and/or cubic Bezier curves.

The one or more memory controllers 220-1 and 220-2 may read data (for example, graphics data) from the one or more memories 310-1 and 310-2 in response to a read request from the CPU 210 or the GPU 260 and may transmit the data (for example, the graphics data) to a corresponding element (for example, 210, 240, or 260). The one or more memory controllers 220-1 and 220-2 may write data (for example, graphics data) from a corresponding element (for example, 210, 230, or 240) to the one or more memories 310-1 and 310-2 in response to a write request from the CPU 210 or the GPU 260.

The one or more memory controllers 220-1 and 220-2 are separated from the CPU 210 or the GPU 260 in the embodiment illustrated in FIG. 1. However, the one or more memory controllers 220-1 and 220-2 may be formed within the CPU 210, the GPU 260, or the one or more memories 310-1 and 310-2.

In exemplary embodiments in which the first memory 310-1 is fixated with volatile memory and the second memory 310-2 is formed with non-volatile memory, the first memory controller 220-1 may be implemented to be able to communicate with the first memory 310-1 and the second memory controller 220-1 may be implemented to be able to communicate with the second memory 310-2. The volatile memory may be random access memory (RAM), static RAM (SRAM), dynamic RAM (DRAM), synchronous DRAM (SDRAM), thyristor RAM (T-RAM), zero capacitor RAM (Z-RAM), or twin transistor RAM (TTRAM). The non-volatile memory may be electrically erasable programmable read-only memory (EEPROM), flash memory, magnetic RAM (MRAM), spin-transfer torque MRAM, ferroelectric RAM (FeRAM), phase-change RAM (PRAM), or resistive RAM (RRAM). The non-volatile memory may also be implemented as a multimedia card (MMC), an embedded MMC (eMMC), a universal flash storage (UFS), a solid state drive (SSD), or a universal serial bus (USB) flash drive.

The one or more memory controllers 220-1 and 220-2 may store a program (or an application) or instructions, which can be executed by the CPU 210. In addition, the one or more memory controllers 220-1 and 220-2 may store data to be used by a program executed by the CPU 210. The one or more memory controllers 220-1 and 220-2 may also store a user application and graphics data related with the user application and may store data (or information to be used or generated by components included in the SoC 200. The one or more memory controllers 220-1 and 220-2 may store data used for and/or generated by the operation of the GPU 260. The one or more memory controllers 220-1 and 220-2 may store command streams for the process of the GPU 260.

The display controller 240 may transmit data processed by the CPU 210 or data (for example, graphics data) processed by the GPU 260 to the display 400. The display 400 may be implemented as a monitor, a TV monitor, a projection device, a thin film transistor-liquid crystal display (TFT-LCD), a light emitting diode (LED) display, an organic LED (OLED) display, an active-matrix OLED (AMOLED) display, or a flexible display, for example.

The display 400 may be integrated into the computing device 100. For example, the display 400 may be a screen of a portable electronic device or a stand-alone device connected to the computing device 100 through a wireless or wired communication link. Alternatively, the display 400 may be a computer monitor connected to a PC through a cable or a wired link.

The GPU 260 may receive commands from the CPU 210 and execute the commands Commands executed by the GPU 260 may include a graphics command, a memory transfer command, a kernel execution command, a tessellation command for adjusting level-of-detail (LOD) using non-geometry information, or a texturing command for adjusting LOD using non-geometry information, for example. The GPU 260 may perform graphics operations to render graphics data.

When an application executed by the CPU 210 requests graphics processing, the CPU 210 may transmit the graphics data and a graphics command to the GPU 260 so that the graphics data is rendered in the display 400. The graphics command may include a tessellation command for adjusting LOD using non-geometry information or a texturing command for adjusting LOD using non-geometry information. The graphics data may include vertex data, texture data, or surface data. A surface may include a parametric surface, a subdivision surface, a triangle mesh, or a curve.

The CPU 210 may transmit a graphics command and graphics data to the GPU 260 in some embodiments. In other embodiments, when the CPU 210 writes a graphics command and graphics data to the one or more memories 310-1 and 310-2, the GPU 260 may read the graphics command and the graphics data from the one or more memories 310-1 and 310-2. The GPU 260 may directly access a GPU cache 290. Accordingly, the GPU 260 may write or read graphics data to or from the GPU cache 290 without using the bus 201.

The GPU 260 and the GPU cache 290 are separated from each other in the embodiments illustrated in FIG. 1, but the GPU 260 may include the GPU cache 290 in other embodiments. For example, the GPU cache 290 may be formed with DRAM or SRAM. The CPU 210 or the GPU 260 may store processed (or rendered) graphics data in a frame buffer included in the one or more memories 310-1 and 310-2.

Figure 2:
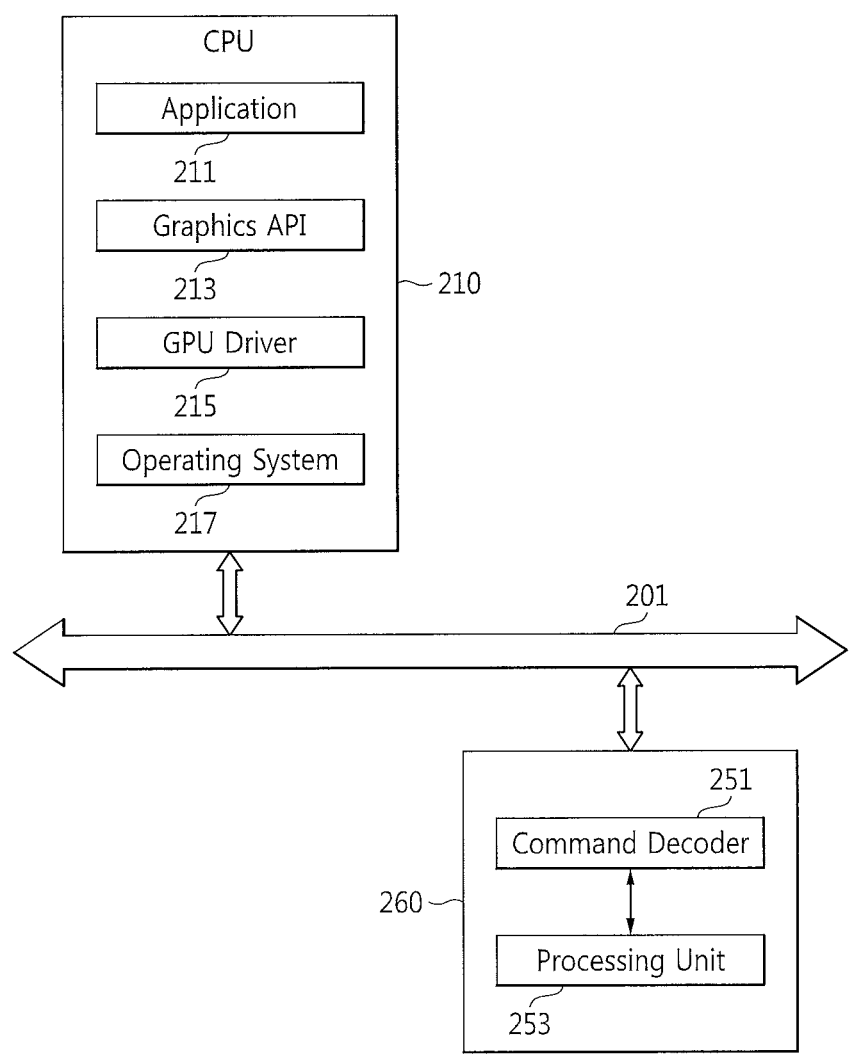
FIG. 2 is a block diagram of a central processing unit (CPU) and a graphics processing unit (GPU) illustrated in FIG. 1.

FIG. 2 is a block diagram of an exemplary embodiment of the CPU 210 and the GPU 260 illustrated in FIG. 1. Referring to FIG. 2, the CPU 210 and the GPU 260 may communicate with each other via the bus 201. For example, the CPU 210 and the GPU 260 may be integrated into a mother board or a SoC or may be implemented in a graphics card installed at a mother board.

The CPU 210 may include an application (for example, a software application) 211, a graphics API 213, a GPU driver 215, and an OS 217. The CPU 210 may execute the components 211, 213, 215, and 217.

The application 211 may include instructions for displaying graphics data and/or instructions to be executed in the GPU 260. The application 211 may output the instructions to the graphics API 213. The graphics API 213 may convert the instructions received from the application 211 into a format used by the GPU driver 215.

The GPU driver 215 may receive the instructions through the graphics API 213 and may control the operation of the GPU 260 so that the instructions are carried out by the GPU 260. The GPU driver 215 may transmit commands to the GPU 260 through the OS 217 or may transmit the commands to the one or more memories 310-1 and 310-2 that can be accessed by the GPU 260. The GPU 260 may include a command decoder (or a command engine) 251 and one or more processing units 253.

In exemplary embodiments command decoder 251 receives a command from the CPU 210 or a command received through the one or more memories 310-1 and 310-2 and controls the GPU 260 to execute the command. Each of the processing units 253 may be a programmable processing unit or a fixed-function processing unit.

A programmable processing unit may be a programmable shader unit that can execute at least one shader program, for example. The programmable shader unit may be downloaded from the CPU 210 to the GPU 260. Programmable shader units run in the processing units 253 may include a vertex shader unit, a hull shader unit, a domain shader unit, a geometry shader unit, a pixel shader unit (or fragment shader unit), and/or a unified shader unit, for example.

A fixed-function processing unit may include hardware. The hardware may be hard-wired to perform certain functions. For example, the fixed-function processing unit among the processing units 253 may include processing units that perform raster operations. For example, the processing units 253 may form a 3D graphics pipeline. The 3D graphics pipeline may comply with OpenGL® API, Open GL ES API, DirectX API, Renderscript API, WebGL API, or Open VG® API, for example.

Figure 3:
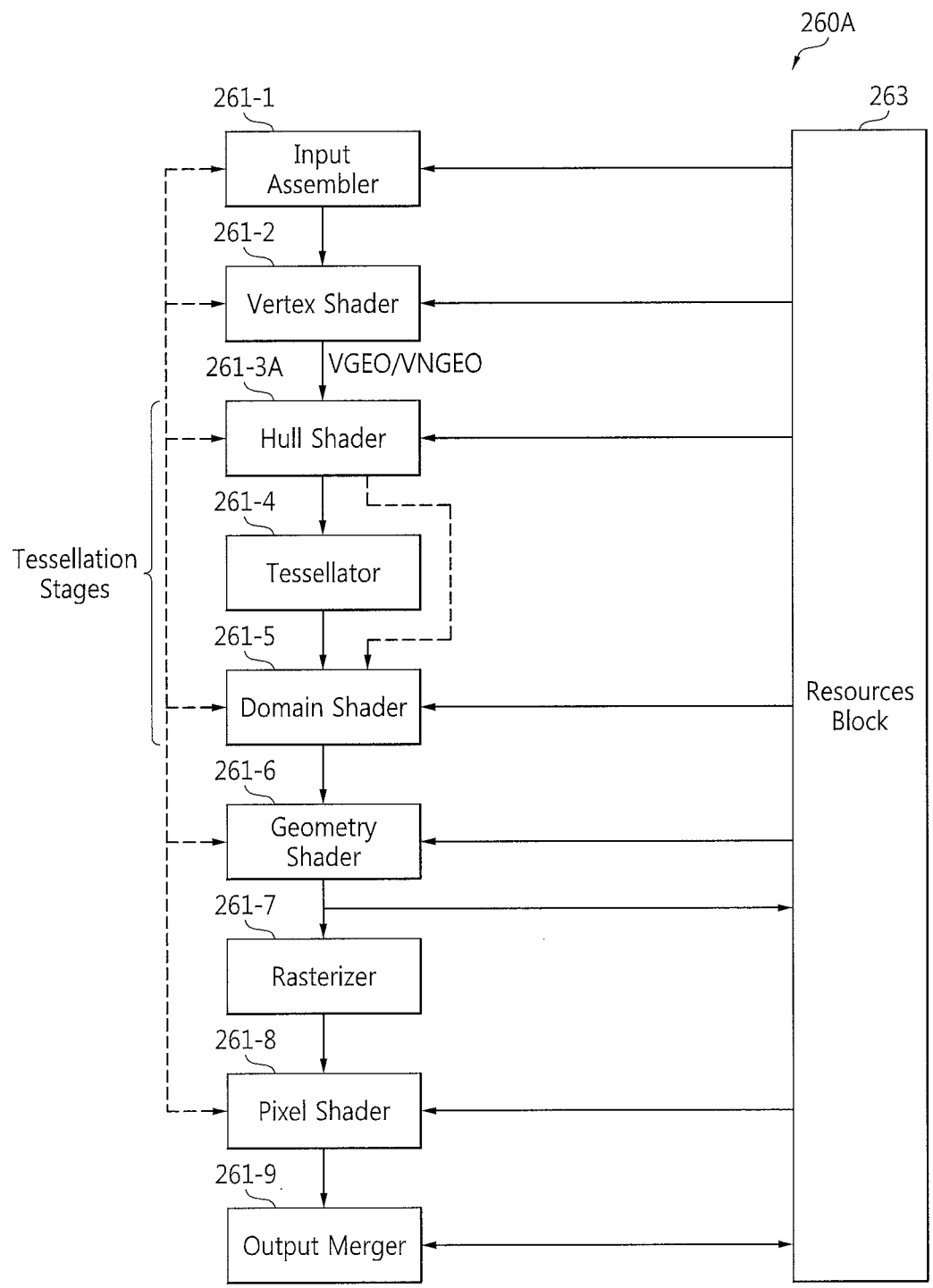
FIG. 3 is a conceptual diagram for explaining a graphics pipeline of the GPU illustrated in FIG. 1, which can adjust level-of-detail (LOD) using non-geometry information, according to some embodiments of the inventive concept.

FIG. 3 is a conceptual diagram for explaining a graphics pipeline 260A of the GPU 260 illustrated in FIG. 1, which can adjust LOD using non-geometry information, according to some embodiments of the inventive concept. The graphics pipeline 260A may correspond to a graphics pipeline in Microsoft® DirectX 11.

In exemplary embodiments graphics pipeline 260A includes a shader which can perform either tessellation or texturing. The shader may generate LOD using geometry information VGEO for tessellation or texturing and may adjust the LOD using non-geometry information VNGEO for tessellation or texturing.

The graphics pipeline 260A may include a plurality of processing stages including the processing units 253 illustrated in FIG. 2 and a resources block 263. The processing stages (or the processing units 253) may include an input assembler 261-1, a vertex shader 261-2, a hull shader 261-3A, a tessellator 261-4, a domain shader 261-5, a geometry shader 261-6, a rasterizer 261-7, a pixel shader 261-8, and an output merger 261-9.

The hull shader 261-3A, the tessellator 261-4, and the domain shader 261-5 may form tessellation stages of the graphics pipeline 260A, for example. Accordingly, the tessellation stages may perform tessellation (or a tessellation operation). The pixel shader 261-8 may be referred to as a fragment shader. For example, the input assembler 261-1, the tessellator 261-4, the rasterizer 261-7, and the output merger 261-9 are fixed-function stages in exemplary embodiments and vertex shader 261-2, the hull shader 261-3A, the domain shader 261-5, the geometry shader 261-6, and the pixel shader 261-8 are programmable stages.

In exemplary embodiments programmable stages have a structure in which a particular kind of shader program can be run. For example, the vertex shader 261-2 may run or execute a vertex shader program, the hull shader 261-3A may run a hull shader program, the domain shader 261-5 may run a domain shader program, the geometry shader 261-6 may run a geometry shader program, and the pixel shader 261-8 may run a pixel shader program. For example, each shader program may be executed in a shader unit of the GPU 260 at an appropriate timing.

In some exemplary embodiments, different kinds of shader programs may be executed in a common shader (or a common shader unit) of the GPU 260. For example, the common shader may be a unified shader. In other embodiments, at least one dedicated shader may exclusively run at least one particular kind of shader program.

In exemplary embodiments input assembler 261-1, the vertex shader 261-2, the hull shader 261-3A, the domain shader 261-5, the geometry shader 261-6, the pixel shader 261-8, and the output merger 261-9 may communicate data with the resources block 263. Accordingly, the input assembler 261-1, the vertex shader 261-2, the hull shader 261-3A, the domain shader 261-5, the geometry shader 261-6, the pixel shader 261-8, and the output merger 261-9 may retrieve or receive input data from the resources block 263. The geometry shader 261-6 and the output merger 261-9 may write output data to the resources block 263. In accordance with principles of inventive concepts, communication between each of the components 261-1 through 261-9 and the resources block 263 illustrated in FIG. 3 is just an example and may be modified in various ways.

In exemplary embodiments input assembler 261-1 may acquire a plurality of vertices from a vertex buffer (not shown) of the one or more memories 310-1 and 310-2 and process the vertices. As an alternative, the input assembler 261-1 may directly transmit a plurality of vertices to be processed to the vertex shader 261-2. As another alternative, the input assembler 261-1 may instruct the vertex shader 261-2 to retrieve a plurality of vertices to be processed from the vertex buffer.

The vertex shader 261-2 may process a plurality of vertices output from the input assembler 261-1 and/or a plurality of vertices output from the resources block 263 and may generate output vertices corresponding to the respective processed vertices. The vertices input to the vertex shader 261-2 are referred to as input control points and the output vertices generated from the vertex shader 261-2 are referred to as output control points.

The vertex shader 261-2 may generate at least one output attribute with respect to an output vertex. In exemplary embodiments a vertex input to the vertex shader 261-2 may include at least one input attribute. Output attributes may not be the same as input attributes. For example, the vertex shader 261-2 may generate output attributes by adding new attributes to or subtracting new attributes from input attributes. The input attributes may include vertex information (for example, coordinate information, normal vector, texture information, and/or color information).

The output attributes may include the geometry information VGEO and the non-geometry information VNGEO. The geometry information VGEO may be the depth values or curvature of the output control points of the vertex shader 261-2. The non-geometry information VNGEO may be brightness values of the output control points of the vertex shader 261-2, brightness values of patches, brightness values of primitives, or brightness values of frames, for example. In some exemplary embodiments, the non-geometry information VNGEO may also include shadow information.

The hull shader 261-3A may generate LOD using the geometry information VGEO and may adjust the LOD using the non-geometry information VNGEO. The LOD may be tessellation factors. At this time, the hull shader 261-3A may function as a source that outputs the geometry information VGEO and the non-geometry information VNGEO.

Figure 4:
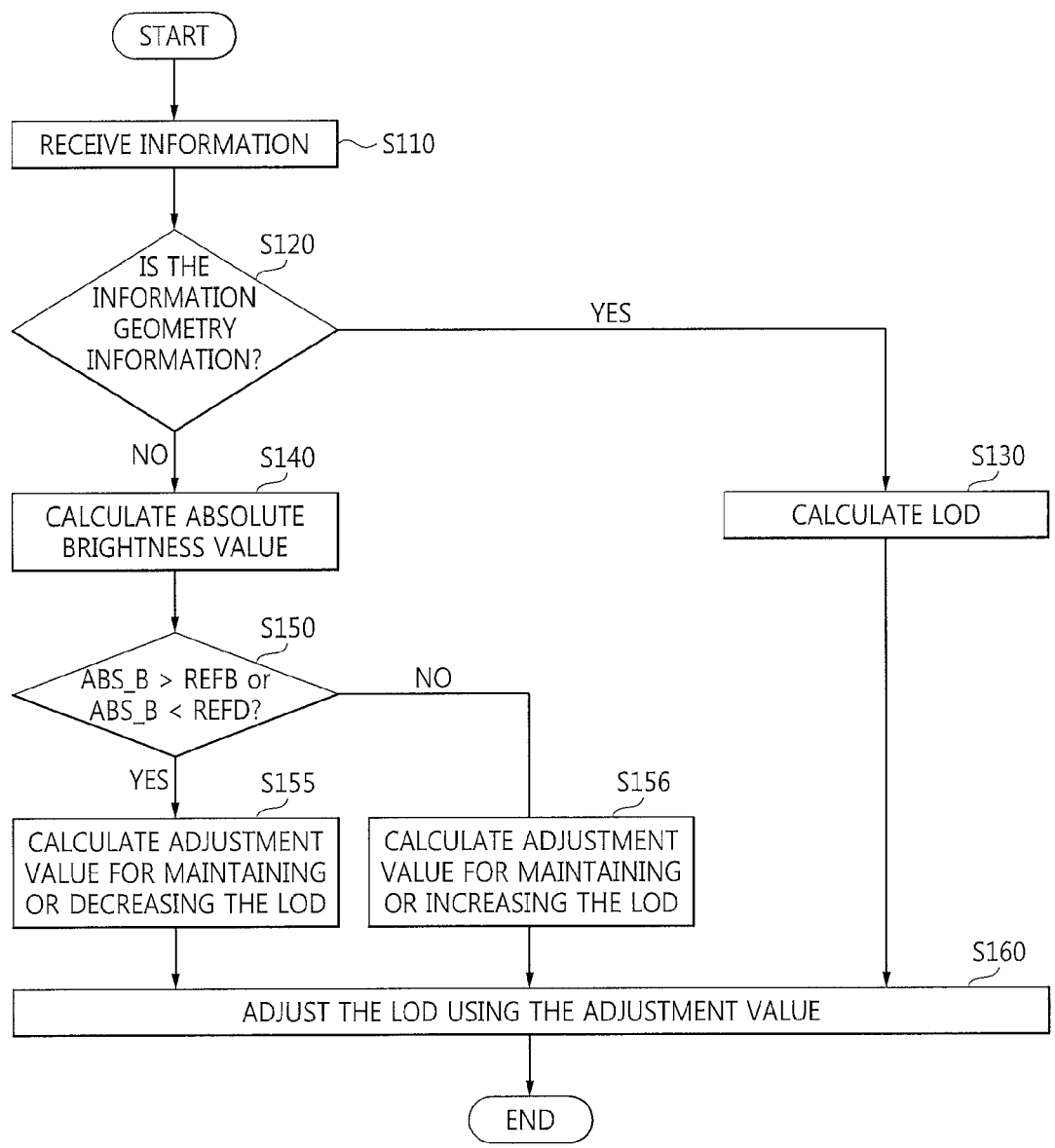
FIG. 4 is a flowchart of a method of operating the GPU illustrated in FIG. 1, which adjusts LOD using non-geometry information, according to some embodiments of the inventive concept.

FIG. 4 is a flowchart of a method of operating the GPU 260 illustrated in FIG. 1, which adjusts LOD using the non-geometry information VNGEO, according to some exemplary embodiments of inventive concepts. FIG. 5 is a conceptual diagram for explaining comparative operations with respect to a generated absolute brightness value and an absolute brightness reference value in accordance with principles of inventive concepts.

Referring to FIGS. 3 through 5, the hull shader 261-3A receives output attributes (for example, information) of the vertex shader 261-2 in operation S110 and determines whether the information is the geometry information VGEO about vertices (for example, output control points of the vertex shader 261-2) in operation S120. When the information is the geometry information VGEO, the hull shader 261-3A generates LOD using the geometry information VGEO in operation S130.

The hull shader 261-3A may generate and assign LOD for each object, primitive, patch, edge, vertex or control point. That is, in exemplary embodiments, the hull shader 261-3A may assign a tessellation factor for every object, primitive, patch, edge, vertex or control point. After determining LOD using the geometry information VGEO in operation S130, the process proceeds to step S160, which will be described in greater detail below.

In an alternative to operation S130, when information received from the vertex shader 261-2 is the non-geometry information VNGEO about vertices (for example, output control points of the vertex shader 261-2), the process moves to operation S140 where the hull shader 261-3A generates an absolute brightness value ABS_B of a patch, primitive or frame defined by the output control points of the vertex shader 261-2 using the non-geometry information VNGEO. In exemplary embodiments, the patch or primitive may include three or four vertices. From operation S140, the hull shader 261-3A determines whether the absolute brightness value ABS_B is greater than a first absolute brightness reference value REFB or less than a second absolute brightness reference value REFD in operation S150.

When the generated absolute brightness value ABS_B (=ABS_B1) is greater than the first absolute brightness reference value REFB, as shown in a first case CASE1 of FIG. 5 (in a diagram in which a higher location within the diagram corresponds to a higher absolute brightness level), in operation S150; a patch or primitive is indefinite. Accordingly, the hull shader 261-3A generates an adjustment value for maintaining or decreasing LOD of the patch or primitive in operation S155.

When the generated absolute brightness value ABS_B ABS_B3) is less than the second absolute brightness reference value REFD, as shown in a third case CASE3 of FIG. 5, in operation S150; a patch or primitive is indefinite. Accordingly, the hull shader 261-3A generates an adjustment value for maintaining or decreasing LOD of the patch or primitive in operation S155. In this exemplary embodiment, the second absolute brightness reference value REFD is less than the first absolute brightness reference value REFB.

However, when the generated absolute brightness value ABS_B (=ABS_B2) is between the first absolute brightness reference value REFB and the second absolute brightness reference value REFD, as shown in a second case CASE2 of FIG. 5, as determined in operation S150; a patch or primitive is definite. Accordingly, the hull shader 261-3A generates an adjustment value for maintaining or increasing LOD of the patch or primitive in operation S156.

In summary, then, if a patch or primitive is indefinite, a system and method in accordance with principles of inventive concepts generates an adjustment value to be used in maintaining or decreasing the LOD of the patch or primitive. On the other hand, if the patch or primitive is definite, the system and method generates an adjustment value to be used in maintaining or increasing the LOD of the patch or primitive. In exemplary embodiments, if an absolute brightness value of a patch or primitive falls outside the range of upper and lower absolute brightness reference values (for example, REFB and REFD, respectively, in FIG. 5), the patch or primitive is considered indefinite. If an absolute brightness value of a patch or primitive falls within the range of upper and lower absolute reference values, the patch or primitive is considered to be definite.

In exemplary embodiments hull shader 261-3A may adjust the LOD (generated in operation S130) using the adjustment value generated in operation S155 (maintaining or decreasing for indefinite) or S156 (maintaining or increasing, for definite) in operation S160. For example, the hull shader 261-3A may adjust the LOD by subtracting or adding the adjustment value from or to the generated LOD. In exemplary embodiments, the adjusting may involve decreasing, maintaining, or increasing, as indicated above. That is, in exemplary embodiments, the hull shader 261-3A may decrease or increase a tessellation factor assigned for each object, primitive, patch, edge, vertex or control point. The hull shader 261-3A may transmit control points and the adjusted LOD (i.e., one or more tessellation factors) to the tessellator 261-4. In some embodiments, the control points may or may not be the same as the output control points of the vertex shader 261-2.

LOD involves at least one tessellation factor. The LOD or the at least one tessellation factor may be an integer or a floating-point number. The first absolute brightness reference value REFB and the second absolute brightness reference value REFD may be adjusted by a user or generated by a program (for example, a hull shader program) during run-time, for example. As described above, the LOD may be generated, assigned or adjusted for each object, primitive, patch, edge, vertex or control point.

Figure 6:
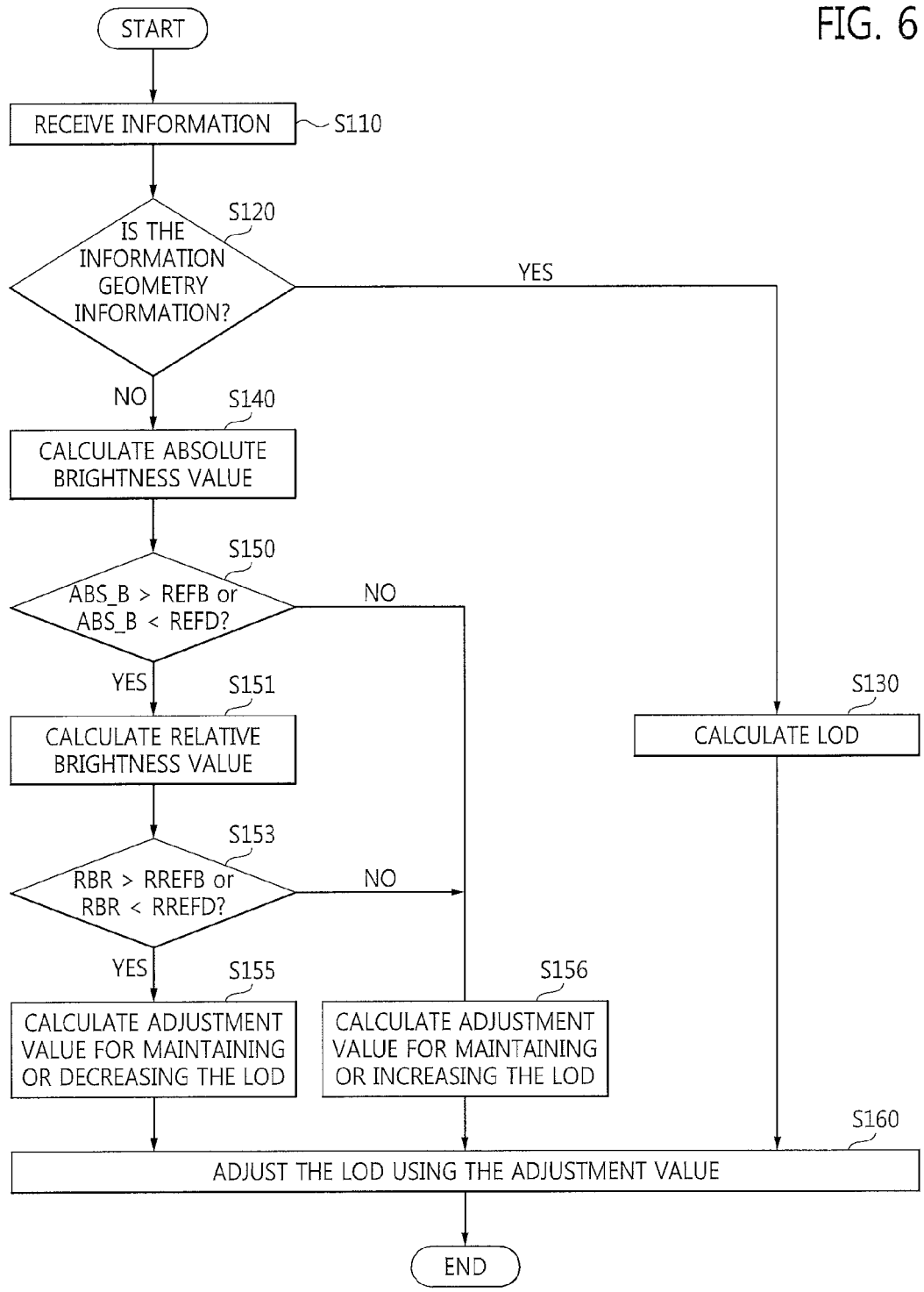
FIG. 6 is a flowchart of a method of operating the GPU illustrated in FIG. 1, which adjusts LOD using non-geometry information, according to other embodiments of the inventive concept.
Figure 7:
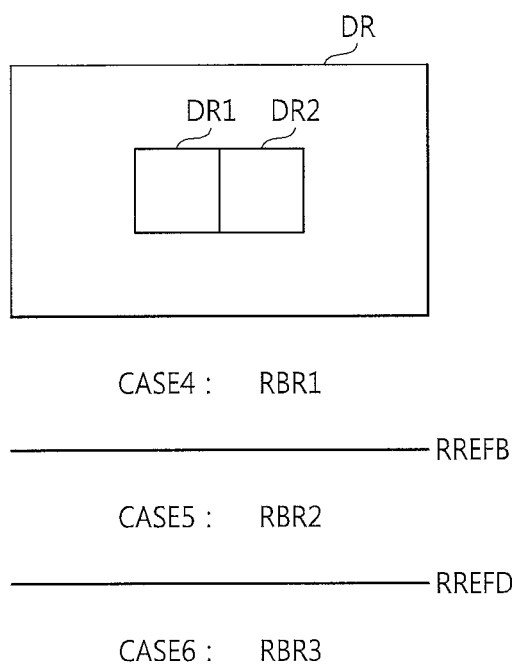
FIG. 7 is a conceptual diagram for explaining comparative operations with respect to a relative brightness value, generated relative brightness value, and a relative brightness reference value.

FIG. 6 is a flowchart of a method of operating the GPU 260 illustrated in FIG. 1, which adjusts LOD using the non-geometry information VNGEO, according to other exemplary embodiments of inventive concepts, as an alternative to the method described in the discussion related to FIG. 4. FIG. 7 is a conceptual diagram for explaining comparative operations with respect to a relative brightness value, generated relative brightness value, and a relative brightness reference value.

An absolute brightness value and/or a relative brightness value may be used in the hull shader 261-3A. Referring to FIGS. 3 through 7, in exemplary embodiments in accordance with principles of inventive concepts, the hull shader 261-3A may adjust LOD using an absolute brightness value and a relative brightness value.

The hull shader 261-3A may receive output attributes (for example, information) of the vertex shader 261-2 in operation S110 and determine whether the information is geometry information VGEO about vertices (for example, output control points of the vertex shader 261-2) in operation S120. When the information is the geometry information VGEO, the hull shader 261-3A may generate LOD using the geometry information VGEO in operation S130.

The hull shader 261-3A may generate and assign LOD for each object, primitive, patch, edge, vertex or control point. In other words, the hull shader 261-3A may assign a tessellation factor for every object, primitive, patch, edge, vertex or control point. After determining LOD using the geometry information VGEO in operation S130, the process proceeds to step S160, which will be described in greater detail below.

In an alternative to operation S130, when information received from the vertex shader 261-2 is the non-geometry information VNGEO about vertices (for example, output control points of the vertex shader 261-2), the process moves to operation S140 where the hull shader 261-3A may generate the absolute brightness value ABSB of a patch, primitive or frame defined by the output control points of the vertex shader 261-2 using the non-geometry information VNGEO.

From operation S140 the process proceeds to operation S150 where absolute brightness values are compared. If absolute brightness values indicate that the patch or primitive is indefinite (for example, the value falls outside the range of upper and lower absolute brightness reference values), the process may proceed to operation S151. On the other hand, if absolute brightness values indicate that the patch or primitive is definite (for example, the value falls within the range of, that is, between, upper and lower absolute brightness reference values), the process may proceed to operation S156. That is, in exemplary embodiments when the absolute brightness value ABS_B (=ABS_B1) is greater than the first absolute brightness reference value REFB, or when the absolute brightness value ABS_B (=ABS_B3) is less than the second absolute brightness reference value REFD, the process may proceed to operation S151 where the hull shader 261-3A may generate a relative brightness value RBR of the patch, primitive or frame defined by the output control points of the vertex shader 261-2 using the non-geometry information VNGEO For example, in a case where a first patch (or a first primitive) DR1 in an image DR is subjected to LOD adjustment and a second patch (or a second primitive) DR2 is adjacent to the first patch DR1, as shown in FIG. 7; when the relative brightness value RBR (=RBR1) is greater than a first relative brightness reference value RREFB as in a fourth case CASE4 in operation S153, the first patch DR1 is indefinite. Accordingly, the hull shader 261-3A may generate an adjustment value for maintaining or decreasing LOD of the first patch DR1 in operation S155.

When the relative brightness value RBR (=RBR3) is less than a second relative brightness reference value RREFD as in a sixth case CASE6 in operation S153, the first patch DR1 is indefinite. Accordingly, the hull shader 261-3A may generate an adjustment value for maintaining or decreasing LOD of the first patch DR1 in operation S155.

When the relative brightness value RBR (=RBR2) is between the first relative brightness reference value RREFB and the second relative brightness reference value RREFD, as in a fifth case CASE5, in operation S153; the first patch DR1 is definite. Accordingly, the hull shader 261-3A may generate an adjustment value for maintaining or increasing LOD of the first patch DR1 in operation S156.

That is, in accordance with principles of inventive concepts, if a relative brightness value falls outside a range of upper and lower relative reference values (RREFB and RREFD in this exemplary embodiment), the first patch DR1 is indefinite and an associated level of detail may be left at the "base" level or adjusted downward in accordance with principles of inventive concepts using adjustment factors developed in process S155 and, if a relative brightness value falls within the range of relative reference values, the first patch DR1 is definite and an associated level of detail may be left at the "base" level or adjusted upward in accordance with principles of inventive concepts using adjustment factors developed in process S156.

As shown in FIG. 7, the second relative brightness reference value RREFD is less than the first relative brightness reference value RREFB. The first relative brightness reference value RREFB may be set to be greater or less than the first absolute brightness reference value REFB and the second relative brightness reference value RREFD may be set to be greater or less than the second absolute brightness reference value REFD.

The hull shader 261-3A may adjust the LOD, which has been generated in operation S130 (also referred to herein as the "base" LOD), using the adjustment value generated in operation S155 or S156 in operation S160. For example, the hull shader 261-3A may adjust the LOD by subtracting or adding the adjustment value from or to the LOD.

The hull shader 261-3A may decrease or increase a tessellation factor assigned for each object, primitive, patch, edge, vertex or control point. The hull shader 261-3A may transmit control points and the adjusted LOD (i.e., one or more tessellation factors) to the tessellator 261-4. The control points may or may be different from the output control points of the vertex shader 261-2.

In exemplary embodiments in accordance with principles of inventive concepts LOD involves at least one tessellation factor and the LOD or the at least one tessellation factor may be an integer or a floating-point number. The first relative brightness reference value RREFB and the second relative brightness reference value RREFD may be adjusted by a user or generated by a program (for example, a hull shader program) during run-time. As described above, the LOD may be generated, assigned or adjusted for each object, primitive, patch, edge, vertex or control point.

Figure 8:
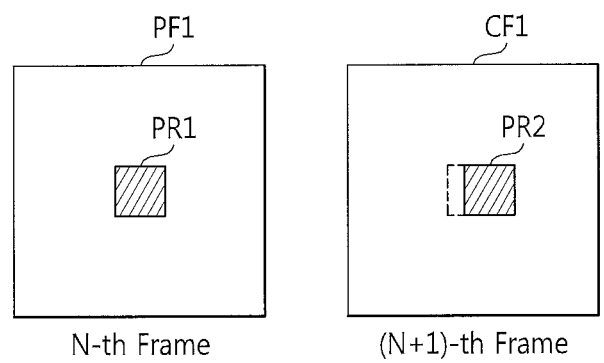
FIG. 8 is a conceptual diagram for explaining a method of adjusting LOD using a moving speed of a patch or primitive.

FIG. 8 is a conceptual diagram illustrating a method of adjusting LOD using the moving speed of a patch or primitive. Referring to FIGS. 3 and 8, the hull shader 261-3A may adjust LOD using the moving speed or movement of a patch or primitive apart from, or in addition to, adjustments based on the brightness of a patch, primitive or frame. The moving speed, or movement, is another example of non-geometry information VNGEO which may be employed in accordance with principles of inventive concepts in adjusting LOD.

When a patch or primitive at a center of an image slowly moves between an N-th frame PF1 and an (N+1)-th frame CF1, a viewer may concentrate on the image quality of the patch, and, in accordance with principles of inventive concepts, the hull shader 261-3A may maintain or increase LOD which has been generated for the patch using the geometry information VGEO. A patch (or primitive) PR1 in the N-th frame PF1 is a patch (or primitive) before the movement and a patch (or primitive) PR2 in the (N+1)-th frame CF1 is a patch (or primitive) after the movement. In other words, the patches (or primitives) PR1 and PR2 are the same, only moved.

In accordance with principles of inventive concepts, hull shader 261-3A illustrated in FIG. 3 may generate LOD using the geometry information VGEO output from the vertex shader 261-2; may adjust the LOD using the non-geometry information VNGEO output from the vertex shader 261-2, i.e., the moving speed or movement of a patch or primitive moving between frames; and may output the adjusted LOD to the tessellator 261-4.

Figure 9:
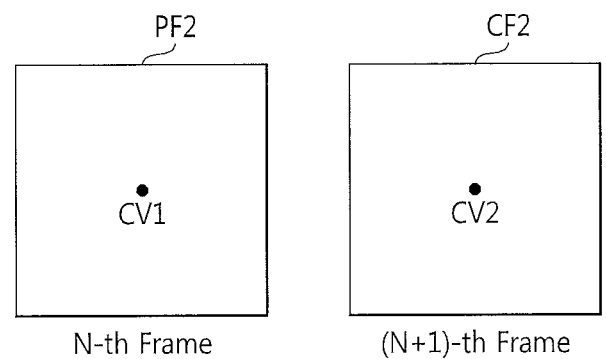
FIG. 9 is a conceptual diagram for explaining a method of adjusting LOD using a color gradient of a patch or primitive.

FIG. 9 is a conceptual diagram illustrating a method of adjusting LOD using a color gradient of a patch or primitive in accordance with principles of inventive concepts. Referring to FIGS. 3 and 9, the hull shader 261-3A may adjust LOD using the color gradient of a patch or primitive apart from, or in addition to, adjustments based on the brightness of a patch, primitive or frame.

In exemplary embodiments in accordance with principles of inventive concepts, when first color values CV1 of a patch or primitive in an N-th frame PF2 are almost the same as second color values CV2 of a patch or primitive in an (N+1)-th frame CF2, that is, when a color gradient is very low; the hull shader 261-3A maintains or increases LOD which has been generated using the geometry information VGEO. In other words, the hull shader 261-3A may generate LOD using the geometry information VGEO output from the vertex shader 261-2 and may adjust the LOD using the non-geometry information VNGEO output from the vertex shader 261-2, i.e., the color gradient of a patch or primitive between frames.

As described above, the hull shader 261-3A may adjust LOD using the non-geometry information VNGEO output from the vertex shader 261-2 and may transmit the adjusted LOD and control points to the tessellator 261-4. As mentioned above, the control points may or may not be the same as output control points of the vertex shader 261-2.

The hull shader 261-3A may transmit the control points and values relevant to a patch equation to the domain shader 261-5. For example, the patch equation may be a curve equation or a surface equation. For example, the curve equation may be a Hermite curve equation, a Bezier curve equation, a NURBS curve equation, or a B-spline curve equation. The values relevant to a patch equation may be coefficients of the patch equation.

The tessellator 261-4 may perform tessellation using the adjusted LOD (for example, adjusted tessellation factors) and the control points received from the hull shader 261-3A and may transmit tessellated control points (or domain coordinates) to the domain shader 261-5. In accordance with principles of inventive concepts, the tessellator 261-4 determines domain coordinates of the control points received from the hull shader 261-3A, outputs the domain coordinates to the domain shader 261-5, and outputs information (for example, topology information) indicating graphical features relating to the domain coordinates to the domain shader 261-5.

The domain shader 261-5 may estimate parametric equations for the domain coordinates determined by the tessellator 261-4 and may output vertex coordinates according to the estimation result. In accordance with principles of inventive concepts, the domain shader 261-5 may receive information indicating the domain coordinates and graphical features from the tessellator 261-4, may receive the control points and the values relevant to the patch equation from the hull shader 261-3A, and may generate vertex coordinates using these inputs, and may generate information indicating graphical features relating to the vertex coordinates.

The geometry shader 261-6 may receive the information indicating graphical features relating to the vertex coordinates from the domain shader 261-5 and may generate a plurality of graphics primitives using this information. In exemplary embodiments, primitives may include points, lines, and/or triangles.

The geometry shader 261-6 may receive tessellated lines from the domain shader 261-5 and may generate a plurality of triangle primitives based on the tessellated lines. Alternatively, the geometry shader 261-6 may receive two vertex coordinates corresponding to each of the tessellated lines from the domain shader 261-5 and may generate a set of three vertex coordinates corresponding to a single triangle primitive.

The rasterizer 261-7 may receive the graphics primitives from the geometry shader 261-6 and may transform the graphics primitives into fragments. For example, the rasterizer 261-7 may transform three vertex coordinates corresponding to a triangle primitive into a plurality of fragments. The rasterizer 261-7 may generate geometry information and non-geometry information regarding the fragments.

The pixel shader 261-8 may receive the fragments from the rasterizer 261-7 and may generate a plurality of shaded pixels according to a pixel shader program. The output merger 261-9 may merge pixel data about the shaded pixels received from the pixel shader 261-8 with pixel data that has already been stored in a render target (for example, a frame buffer or a stencil buffer).

Figure 10:
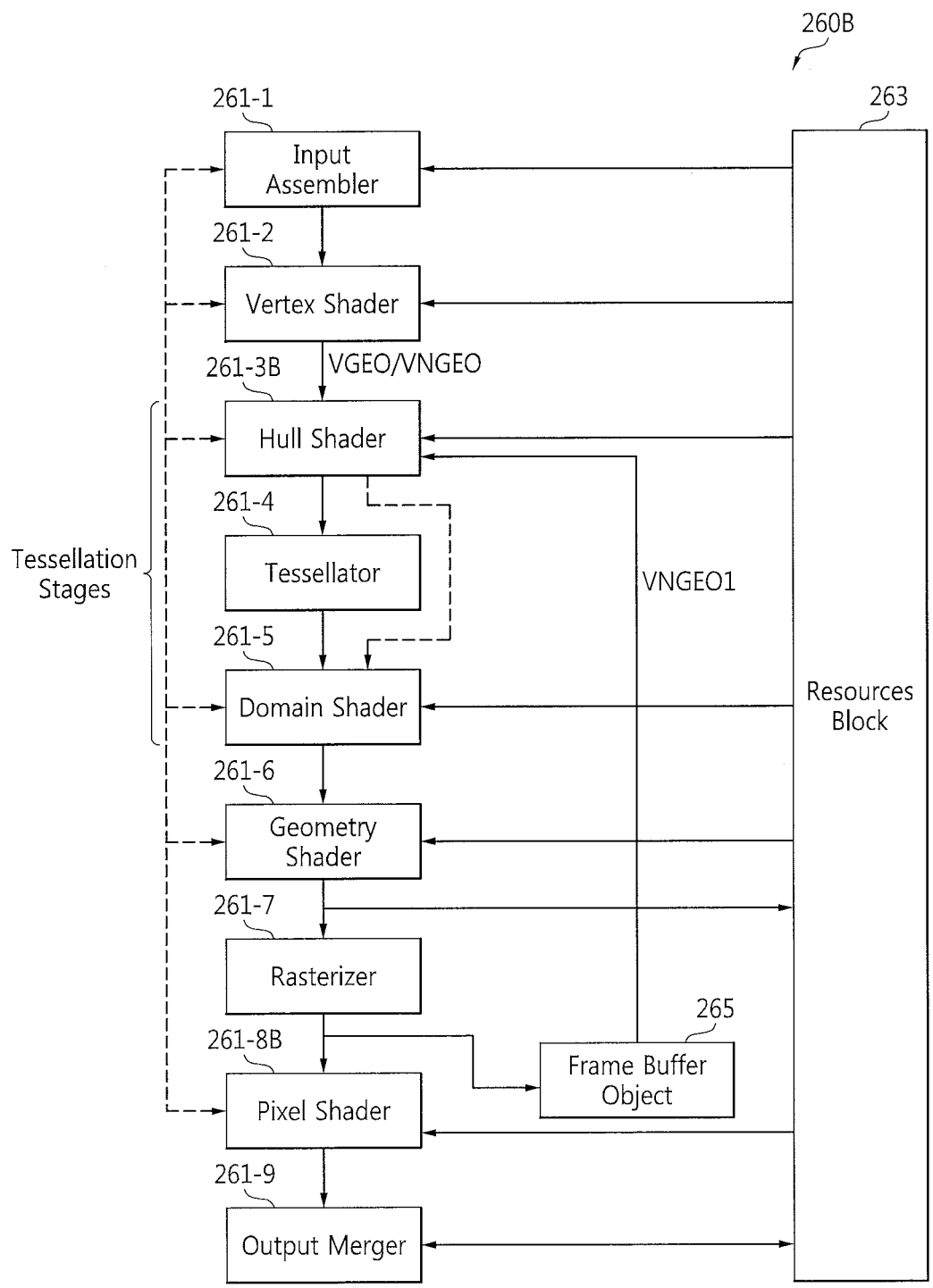
FIG. 10 is a conceptual diagram for explaining a graphics pipeline of the GPU illustrated in FIG. 1, which can adjust LOD using non-geometry information, according to other embodiments of the inventive concept.

FIG. 10 is a conceptual diagram illustrating a graphics pipeline 260B of the GPU 260 illustrated in FIG. 1, which can adjust LOD using non-geometry information, according to exemplary embodiments of inventive concepts. The graphics pipeline 260B may include a plurality of processing stages including the processing units 253 illustrated in FIG. 2 and the resources block 263. The processing stages (or the processing units 253) may include the input assembler 261-1, the vertex shader 261-2, a hull shader 261-3B, the tessellator 261-4, the domain shader 261-5, the geometry shader 261-6, the rasterizer 261-7, a pixel shader 261-8B, and the output merger 261-9. The vertex shader 261-2 may output the geometry information VGEO and the non-geometry information VNGEO to the hull shader 261-3B.

Unlike the hull shader 261-3A illustrated in FIG. 3, the hull shader 261-3B illustrated in FIG. 10 may generate LOD using the geometry information VGEO and adjust the LOD using non-geometry information VNGEO1 output from a frame buffer object 265, in accordance with principles of inventive concepts.

A method of adjusting LOD using the hull shader 261-3B may be substantially the same as or similar to a method of adjusting LOD using the hull shader 261-3A. Therefore, the hull shader 261-3B may use the method of adjusting LOD, which has been described with reference to FIGS. 4 through 9, for example. The frame buffer object 265 receives and stores non-geometry information regarding fragments output from the rasterizer 261-7 and outputs the non-geometry information VNGEO1 to the hull shader 261-3B. The function of the pixel shader 261-8B illustrated in FIG. 10 is substantially the same as or similar to that of the pixel shader 261-8 illustrated in FIG. 3.

Although the frame buffer object 265 is included in the graphics pipeline 260B in the embodiments illustrated in FIG. 10, the position of the frame buffer object 265 may vary with different embodiments. In the embodiments illustrated in FIG. 10, with respect to one frame, the hull shader 261-3B may generate LOD using the geometry information VGEO output from the vertex shader 261-2 and may adjust the LOD using the non-geometry information VNGEO1 received from the frame buffer object 265, for example. The vertex shader 261-2 may function as a first source which outputs the geometry information VGEO regarding a current frame and the frame buffer object 265 may function as a second source which outputs the non-geometry information VNGEO1 regarding the current frame.

Figure 11:
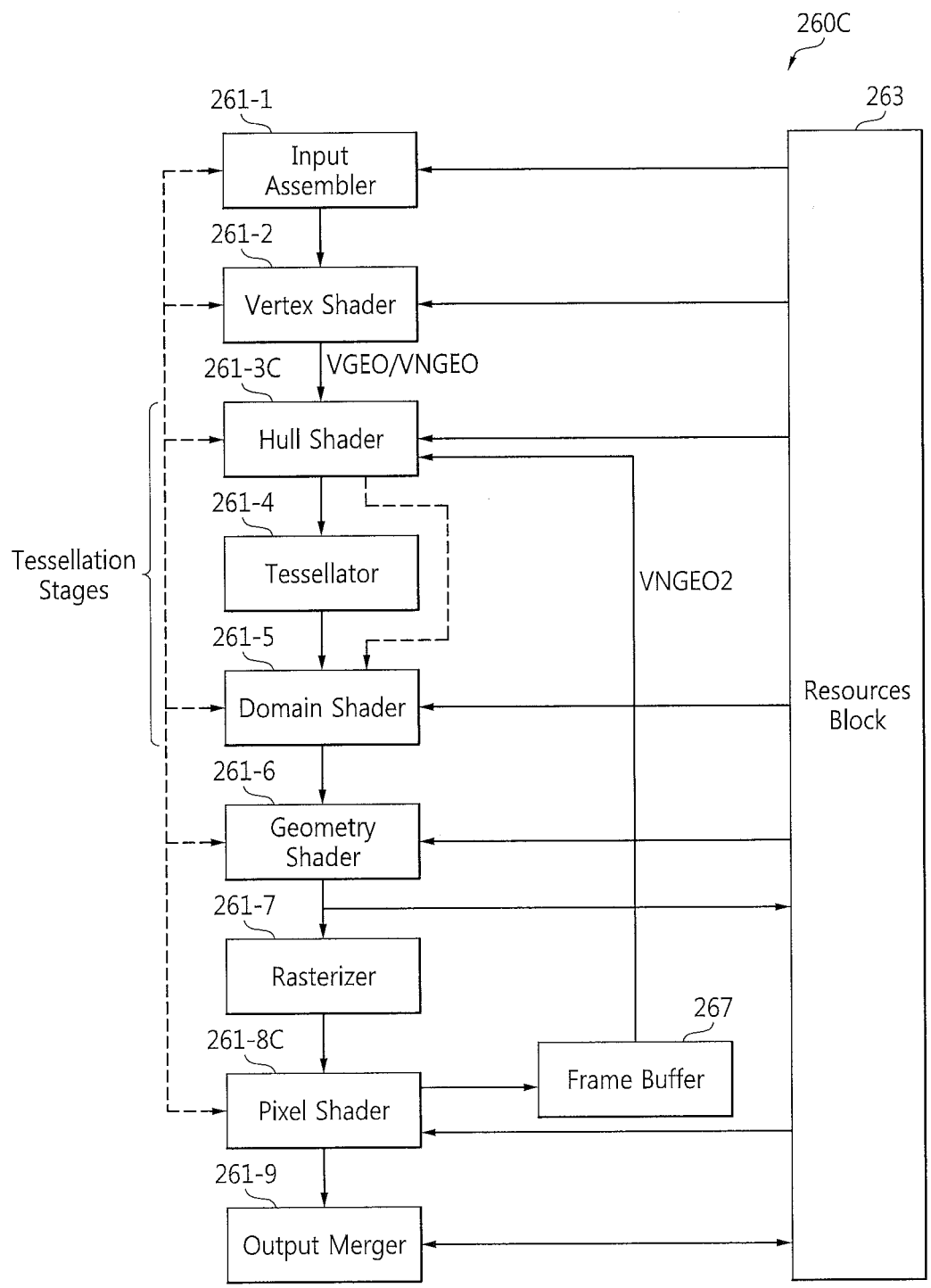
FIG. 11 is a conceptual diagram for explaining a graphics pipeline of the GPU illustrated in FIG. 1, which can adjust LOD using non-geometry information, according to still other embodiments of the inventive concept.

FIG. 11 is a conceptual diagram illustrating a graphics pipeline 260C of the GPU 260 illustrated in FIG. 1, which can adjust LOD using non-geometry information, according to exemplary embodiments of inventive concepts. The graphics pipeline 260C may include a plurality of processing stages including the processing units 253 illustrated in FIG. 2 and the resources block 263.

The processing stages (or the processing units 253) may include the input assembler 261-1, the vertex shader 261-2, a hull shader 261-3C, the tessellator 261-4, the domain shader 261-5, the geometry shader 261-6, the rasterizer 261-7, a pixel shader 261-8C, and the output merger 261-9. The vertex shader 261-2 may output the geometry information VGEO and the non-geometry information VNGEO to the hull shader 261-3C. Unlike the hull shader 261-3A illustrated in FIG. 3, the hull shader 261-3C illustrated in FIG. 11 may generate LOD using the geometry information VGEO output from the vertex shader 261-2 and may adjust the LOD using non-geometry information VNGEO2 received from a frame buffer 267, in accordance with principles of inventive concepts.

A method of adjusting LOD using the hull shader 261-3C is substantially the same as or similar to the method of adjusting LOD using the hull shader 261-3A. Therefore, the hull shader 261-3C may use the method of adjusting LOD, which has been described with reference to FIGS. 4 through 9, in accordance with principles of inventive concepts. The frame buffer 267 may store non-geometry information regarding shaded pixels of a previous frame output from the pixel shader 261-8B and output the non-geometry information VNGEO2 to the hull shader 261-3C.

Although the frame buffer 267 is included in the graphics pipeline 260C in the embodiments illustrated in FIG. 11, the position of the frame buffer 267 may vary with exemplary embodiments. For example, the frame buffer 267 may be included in the resources block 263. In the embodiments illustrated in FIG. 11, the hull shader 261-3C may generate LOD using the geometry information VGEO regarding the current frame and may adjust the LOD using the non-geometry information VNGEO2 regarding the previous frame. The vertex shader 261-2 may function as a first source which outputs the geometry information VGEO regarding a current frame and the frame buffer 267 may function as a second source which outputs the non-geometry information VNGEO2 regarding a previous frame in accordance with principles of inventive concepts.

Figure 12:
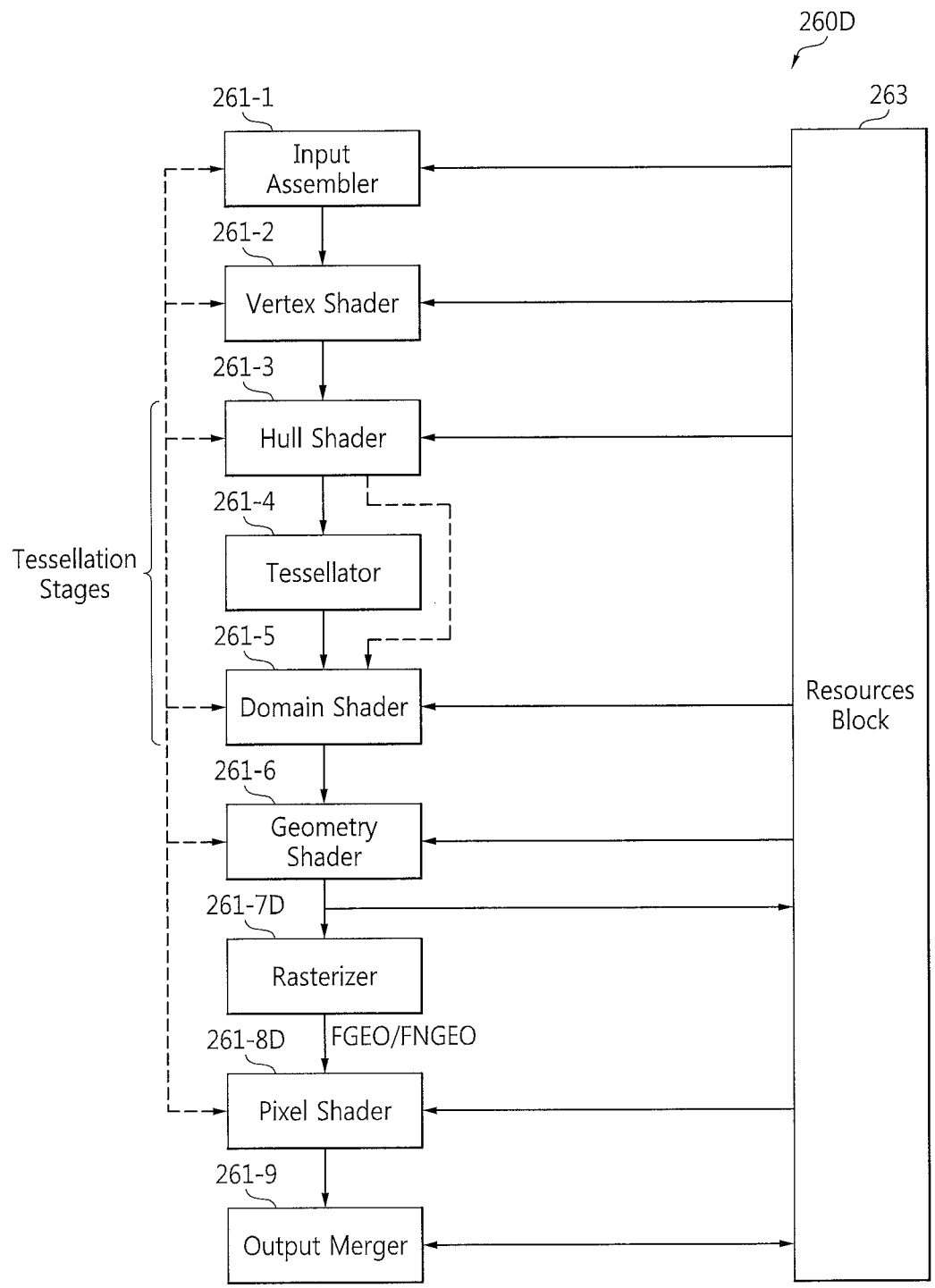
FIG. 12 is a conceptual diagram for explaining a graphics pipeline of the GPU illustrated in FIG. 1, which can adjust LOD using non-geometry information, according to even other embodiments of the inventive concept.

FIG. 12 is a conceptual diagram illustrating a graphics pipeline 260D of the GPU 260 illustrated in FIG. 1, which can adjust LOD using non-geometry information, according to exemplary embodiments of inventive concepts. The graphics pipeline 260D may include a plurality of processing stages including the processing units 253 illustrated in FIG. 2 and the resources block 263. The processing stages (or the processing units 253) may include the input assembler 261-1, the vertex shader 261-2, the hull shader 261-3, the tessellator 261-4, the domain shader 261-5, the geometry shader 261-6, a rasterizer 261-7D, a pixel shader 261-8D, and the output merger 261-9. The rasterizer 261-7D may generate a plurality of fragments and geometry information FGEO and non-geometry information FNGEO regarding the fragments.

The pixel shader 261-8D may generate LOD using the geometry information FGEO output from the rasterizer 261-7D and may adjust the LOD using non-geometry information FNGEO output from the rasterizer 261-7D in accordance with principles of inventive concepts. The pixel shader 261-8D may perform texturing.

The method of adjusting LOD using the hull shader 261-3A is substantially the same as or similar to a method of adjusting LOD using the pixel shader 261-8D in accordance with principles of inventive concepts. Therefore, the pixel shader 261-8D may use the method of adjusting LOD, which has been described with reference to FIGS. 4 through 9. The hull shader 261-3 may receive output control points from the vertex shader 261-2, may generate at least one tessellation factor, and may transmit the output control points and the at least one tessellation factor to the tessellator 261-4, for example.

The tessellator 261-4 may perform tessellation using the output control points and the at least one tessellation factor and may transmit tessellated control points to the domain shader 261-5. For example, the tessellator 261-4 may determine domain coordinates for control points received from the hull shader 261-3, may output the domain coordinates to the domain shader 261-5, and may output information (for example, topology information) indicating graphical features relating to the domain coordinates to the domain shader 261-5.

Figure 13:
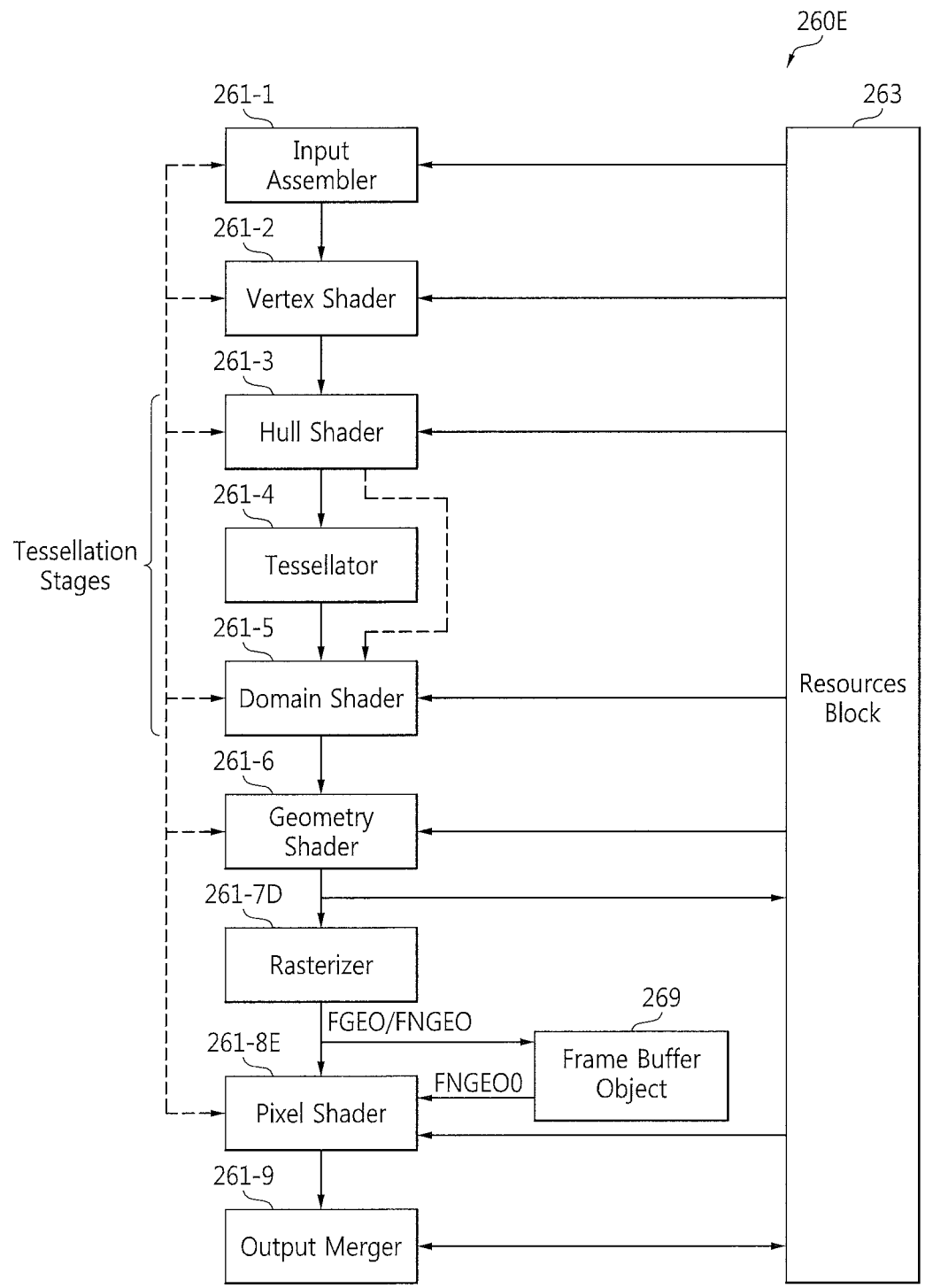
FIG. 13 is a conceptual diagram for explaining a graphics pipeline of the GPU illustrated in FIG. 1, which can adjust LOD using non-geometry information, according to yet other embodiments of the inventive concept.

FIG. 13 is a conceptual diagram illustrating a graphics pipeline 260E of the GPU 260 illustrated in FIG. 1, which can adjust LOD using non-geometry information, according to exemplary embodiments of inventive concepts. The graphics pipeline 260E may include a plurality of processing stages including the processing units 253 illustrated in FIG. 2 and the resources block 263. The processing stages (or the processing units 253) may include the input assembler 261-1, the vertex shader 261-2, the hull shader 261-3, the tessellator 261-4, the domain shader 261-5, the geometry shader 261-6, the rasterizer 261-7D, a pixel shader 261-8E, and the output merger 261-9.

The rasterizer 261-7D may generate a plurality of fragments and the geometry information FGEO and the non-geometry information FNGEO regarding the fragments. The rasterizer 261-7D may transmit the non-geometry information FNGEO to a frame buffer object 269. The amount of the non-geometry information FNGEO transmitted to the frame buffer object 269 may vary with exemplary embodiments. The amount may correspond to a frame, an object, a primitive, a patch, an edge, a vertex, or a control point, for example. The pixel shader 261-8E may generate LOD using the geometry information FGEO output from the rasterizer 261-7D and may adjust the LOD using non-geometry information FNGEO0 output from the frame buffer object 269 in accordance with principles of inventive concepts.

Although the frame buffer object 269 is included in the graphics pipeline 260E in the embodiments illustrated in FIG. 13, the position of the frame buffer object 269 may vary with exemplary embodiment.

The method of adjusting LOD using the hull shader 261-3A is substantially the same as or similar to a method of adjusting LOD using the pixel shader 261-8E. Therefore, the pixel shader 261-8E may use the method of adjusting LOD, which has been described with reference to FIGS. 4 through 9 in accordance with principles of inventive concepts. In the embodiments illustrated in FIG. 13, with respect to one frame, the pixel shader 261-8E may generate LOD using the geometry information FGEO received from the rasterizer 261-7D and may adjust the LOD using the non-geometry information FNGEO0 received from the frame buffer object 269.

The rasterizer 261-7D may function as a first source which outputs the geometry information FGEO regarding a current frame and the frame buffer object 269 may function as a second source which outputs the non-geometry information FNGEO0 regarding the current frame.

Figure 14:
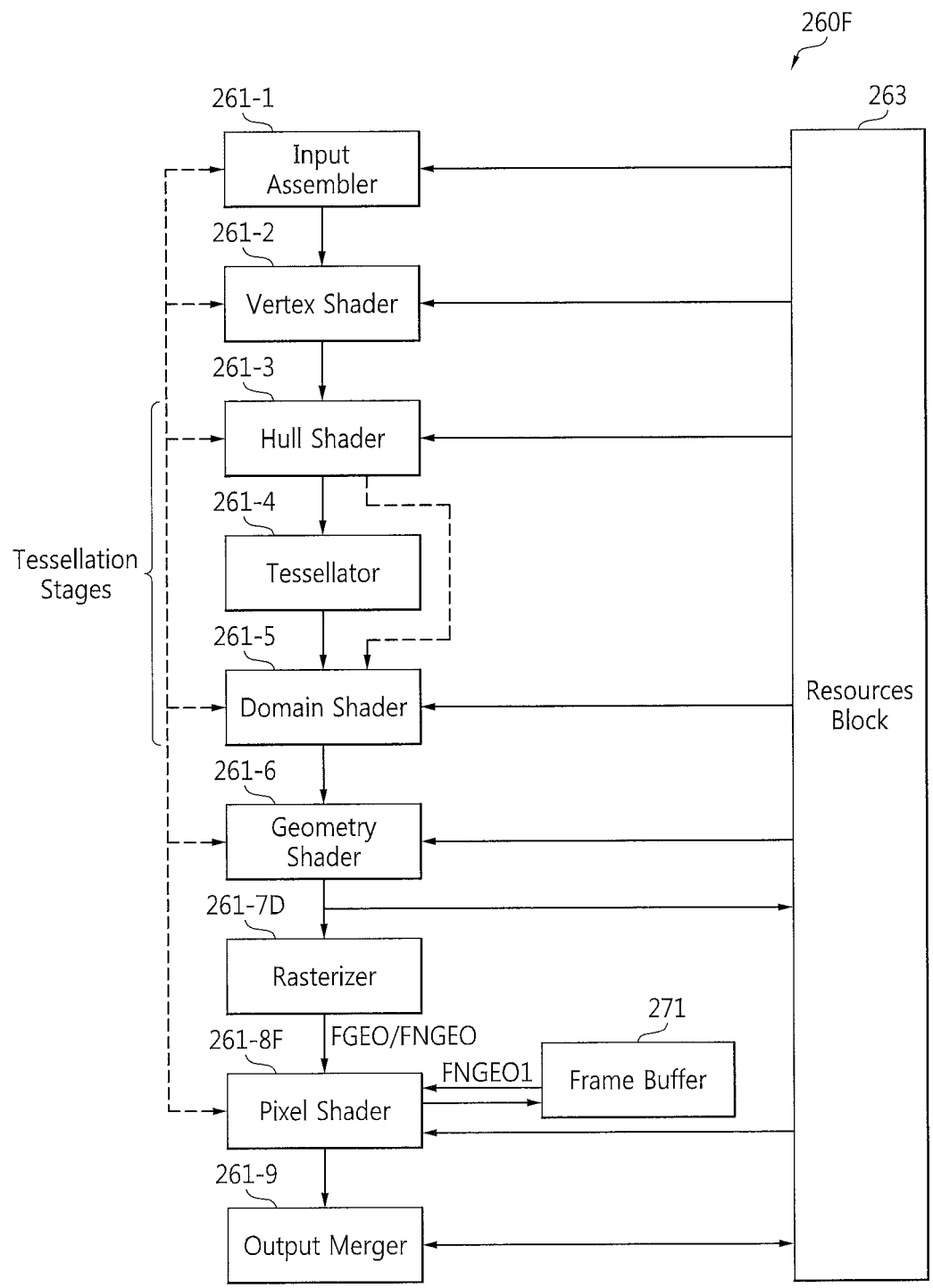
FIG. 14 is a conceptual diagram for explaining a graphics pipeline of the GPU illustrated in FIG. 1, which can adjust LOD using non-geometry information, according to further embodiments of the inventive concept.

FIG. 14 is a conceptual diagram illustrating a graphics pipeline 260F of the GPU 260 illustrated in FIG. 1, which can adjust LOD using non-geometry information, according to exemplary embodiments of inventive concepts. The graphics pipeline 260F may include a plurality of processing stages including the processing units 253 illustrated in FIG. 2 and the resources block 263.

The processing stages (or the processing units 253) may include the input assembler 261-1, the vertex shader 261-2, the hull shader 261-3, the tessellator 261-4, the domain shader 261-5, the geometry shader 261-6, the rasterizer 261-7D, a pixel shader 261-8F, and the output merger 261-9. The rasterizer 261-7D may generate a plurality of fragments and the geometry information FGEO and the non-geometry information FNGEO regarding the fragments.

Unlike the pixel shader 261-8E illustrated in FIG. 13, the pixel shader 261-8F illustrated in FIG. 14 may generate LOD using the geometry information FGEO output from the rasterizer 261-7D and may adjust the LOD using non-geometry information FNGEO1 received from the frame buffer 271. The method of adjusting LOD using the hull shader 261-3A is substantially the same as or similar to a method of adjusting LOD using the pixel shader 261-8F. Therefore, the pixel shader 261-8F may use the method of adjusting LOD, which has been described with reference to FIGS. 4 through 9 in accordance with principles of inventive concepts.

The frame buffer 271 may store non-geometry information regarding a plurality of shaded pixels of a previous frame output from the pixel shader 261-8F and may output the non-geometry information VNGEO1 to the pixel shader 261-8F. The pixel shader 261-8F may transmit non-geometry information regarding a plurality of pixels to the frame buffer 271. The amount of the non-geometry information transmitted to the frame buffer 271 may vary with exemplary embodiment. The amount may correspond to a frame, an object, a primitive, a patch, an edge, a vertex, or a control point, for example.

Although the frame buffer 271 is included in the graphics pipeline 260F in the embodiments illustrated in FIG. 14, the position of the frame buffer 271 may vary with design specifications. For example, the frame buffer 271 may be included in the resources block 263. In the embodiments illustrated in FIG. 14, the pixel shader 261-8F may generate LOD using the geometry information FGEO regarding a current frame and may adjust the LOD using the non-geometry information FNGEO1 regarding a previous frame.

As described above, in a method of adjusting LOD using a GPU including a shader that can perform tessellation or texturing, the LOD is generate using geometry information for the tessellation or texturing and the LOD is adjusted using non-geometry information for the tessellation or texturing. The shader may be a hull shader or a pixel shader, for example. The geometry information and the non-geometry information may be output from one source or may be respectively output from different sources. The geometry information and the non-geometry information may be about one frame or may be respectively about different frames.

A method of adjusting LOD using a GPU including a shader that can perform tessellation or texturing may include a computer program which may be stored in a recording medium. The recording medium may be the CPU 210, the GPU 260, or the one or more memories 310-1 and 310-2. The memories 310-1 and 310-2 may be removable from the SoC 200.

According to exemplary embodiments of inventive concepts, in a GPU including a shader that can perform tessellation or texturing, the shader generates LOD, also referred to herein as a base LOD, using geometry information for the tessellation or texturing, for example, and adjusts the LOD using non-geometry information for the tessellation or texturing. The GPU adjusts the LOD using the non-geometry information, thereby maintaining visual quality and reducing rendering overhead.

While inventive concepts have been particularly shown and described with reference to exemplary embodiments thereof, it will be understood by those of ordinary skill in the art that various changes in forms and details may be made therein without departing from the spirit and scope of inventive concepts as defined by the following claims.

What is claimed is:

1. A method of adjusting level-of-detail (LOD) using a graphics processing unit including a shader configured to perform one operation from among either tessellation or texturing, the method comprising:
   the graphics processing unit receiving output attributes including geometry information and non-geometry information;
   the graphics processing unit generating LOD using the geometry information for the one operation;
   the graphics processing unit generating an adjustment value for adjusting the generated LOD using the non-geometry information; and
   the graphics processing unit adjusting the generated LOD using the adjustment value for the one operation,
   wherein the geometry information is depth values or curvature of output control points,
   wherein the non-geometry information is a brightness value of one from among a patch, a primitive, and a frame, the adjusting of the LOD comprises:
   decreasing the LOD when the brightness value is greater than a first brightness reference value;
   decreasing the LOD when the brightness value is less than a second brightness reference value less than the first brightness reference value; and
   increasing the LOD when the brightness value is between the first brightness reference value and the second brightness reference value.

2. The method of claim 1, wherein the geometry information and the non-geometry information is output from one source.

3. The method of claim 2, wherein the one source is one of either a vertex shader or a rasterizer.

4. The method of claim 1, wherein the geometry information is output from a first source and the non-geometry information is output from a second source.

5. The method of claim 4, wherein the first source is one of either a vertex shader or a rasterizer and the second source is one of either a frame buffer object or a frame buffer storing a previous frame.

6. The method of claim 1, wherein the geometry information and the non-geometry information are related to one frame.

7. The method of claim 1, wherein the geometry information and the non-geometry information are related to different frames.

8. The method of claim 7, wherein the geometry information is related to a current frame and the non-geometry information is related to a previous frame.

9. The method of claim 1, wherein the LOD is assigned for each object, primitive, patch, edge, vertex or control point.

10. A graphics processing unit, comprising:
    a shader configured to perform one operation from among tessellation and texturing,
    wherein the shader receives output attributes including geometry information and non-geometry information, generates a level-of-detail (LOD) using the geometry information, generates an adjustment value for adjusting the generated LOD using the non-geometry information, and adjusts the generated LOD using the adjustment value for the one operation, and
    wherein the geometry information is depth values or curvature of output control points,
    wherein the non-geometry information is a brightness value of one from among a patch, a primitive, and a frame, the adjusting of the LOD comprises:
    decreasing the LOD when the brightness value is greater than a first brightness reference value;
    decreasing the LOD when the brightness value is less than a second brightness reference value less than the first brightness reference value; and
    increasing the LOD when the brightness value is between the first brightness reference value and the second brightness reference value.

11. The graphics processing unit of claim 10, wherein the shader is a unified shader.

12. The graphics processing unit of claim 10, further comprising a vertex shader and a rasterizer, wherein the geometry information and the non-geometry information are output from one of the vertex shader and the rasterizer.

13. The graphics processing unit of claim 10, further comprising:
    a vertex shader;
    a rasterizer; and
    a buffer configured to store one of a current frame and a previous frame,
    wherein the geometry information is output from one of the vertex shader and the rasterizer, the non-geometry information is output from the buffer, and the geometry information is related to the current frame.

14. A system on chip (SoC) comprising:
    a central processing unit (CPU);
    and a graphics processing unit including a shader configured to perform one operation from among tessellation and texturing in response to a command output from the CPU,
    wherein the shader receives output attributes including geometry information and non-geometry information, generates a level-of-detail (LOD) using the geometry information, generates an adjustment value for adjusting the generated LOD using the non-geometry information, and adjusts the generated LOD using the adjustment value for the one operation, and
    wherein the geometry information is depth values or curvature of output control points,
    wherein the non-geometry information is a brightness value of one from among a patch, a primitive, and a frame, the adjusting of the LOD comprises:
    decreasing the LOD when the brightness value is greater than a first brightness reference value;
    decreasing the LOD when the brightness value is less than a second brightness reference value less than the first brightness reference value; and increasing the LOD when the brightness value is between the first brightness reference value and the second brightness reference value.

* * * * *